United States Patent Office

2,956,903
Patented Oct. 18, 1960

2,956,903

COMPOSITION AND METHOD FOR COATING POLYESTER OR POLYAMIDE FABRICS, AND FABRICS COATED THEREBY

David Patrick Spencer, Essendon, Victoria, Australia, assignor to Imperial Chemical Industries of Australia and New Zealand Limited, Melbourne, Victoria, Australia, a company of Victoria No Drawing. Filed Dec. 1, 1958, Ser. No. 777,188

Claims priority, application Australia Dec. 23, 1957

2 Claims. (Cl. 117—76)

This invention relates to the coating of fabrics composed of filaments or fibres or polymeric linear glycol terephthalate esters, polymeric linear diamine adipamides or sebacamides or polymers of caprolactam, hereinafter referred to as polyester or polyamide fabrics, with compounds based on polyvinyl chloride or copolymers of vinyl chloride.

A simplified flow diagram of the process is as follows:

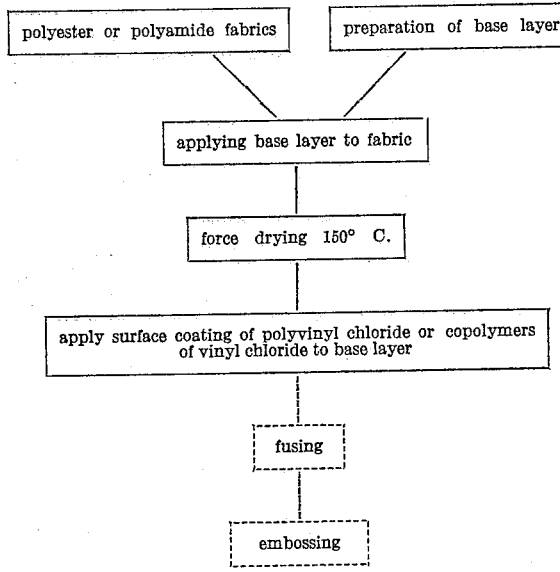

Coated fabrics of this type are well known in the art, but are subject to damage under flex, decreased tear strength of the base fabric, or loss of flexibility in service. The coatings usually break down when subjected to 100,000 flex cycles and usually adhere to the base fabric with an adhesion less than 10 pounds per inch; or alternatively, when coatings having good anchorage to the base fabric are produced, the tear strength and flexibility of the coated fabric are excessively diminished. The coated fabrics described in prior Australian patent application No. 26697/57 show improvements in these properties, but the process described in this patent application involves the application of two base coatings before a coating based on polyvinyl chloride or copolymers of vinyl chloride is applied.

It is the object of this invention to provide, for uncoated polyester or polyamide fabrics, a base coating composition whereby a surface coating consisting substantially of polyvinyl chloride or copolymers of vinyl chloride may be applied directly to the base-coated polyester or polyamide fabric. It is a further object of this invention to provide an improvement in adhesion between coating and base fabric even upon that obtained by the method described in the said previous application.

In achieving these objects the present invention provides, for polyester or polyamide fabrics, a base coating composition comprising: an acrylonitrile rubber; a vinyl tripolymer composed of vinyl chloride, vinyl acetate and vinyl alcohol; a chlorinated rubber; and an organic tri-isocyanate. The weight of vinyl chloride in the vinyl tripolymer is preferably greater than the combined weights of the vinyl acetate and vinyl alcohol.

The present invention also provides a process for coating polyester or polyamide with compounds based on polyvinyl chloride or copolymers of vinyl chloride, comprising the steps of; applying to the uncoated polyester or polyamide fabrics a composition comprising an acrylonitrile rubber, a vinyl tripolymer composed of vinyl chloride, vinyl acetate and vinyl alcohol, a chlorinated rubber, and an organic tri-isocyanate; then applying to the coated polyester or polyamide fabrics a surface coating consisting substantially of polyvinyl chloride or copolymers of vinyl chloride. The invention also includes polyester or polyamide fabrics coated by the said process.

Preferably, the base coating compositions according to this invention are plasticised with a polymeric glycol ester modified with a monocarboxylic acid, for example polypropylene adipate modified with benzoic acid.

More specifically, base coating compositions according to the present invention may comprise by weight between 12% and 22% of acrylonitrile rubber, between 1% and 3% of a vinyl tripolymer of which more than half the weight is vinyl chloride and the remainder is vinyl acetate and vinyl alcohol, between 3% and 7% of chlorinated rubber, between 2% and 3% of plasticiser, and organic tri-isocyanate in an amount at least 7% of the total weight of the said solids.

The following specific examples illustrate, but do not limit the invention. Throughout the specification the percentage and part figures are expressed on a weight basis.

EXAMPLE 1

A polyamide fabric weighing 6 ozs. per square yard woven in yarns composed of 250 denier filaments was doctor knife coated with a coating mass prepared in two portions which were mixed immediately prior to use to give the following composition:

| | Percent by weight |
|---|---|
| Polyacrylonitrile butadiene | 17.0 |
| Chlorinated rubber | 5.0 |
| Vinyl tripolymer | 1.7 |
| Benzoic acid modified polypropylene adipate | 2.5 |
| Ethyl acetate | 55.3 |
| Tetrahydrofurane | 6.0 |
| p-p'-p" Tri-isocyanato triphenylmethane | 2.5 |
| Tri-chlorethylene | 10.0 |

This composition was prepared by first masticating the polyacrylonitrile butadiene by passing several times through a cold two roll horizontal rubber mill directly and without banding. The masticated acrylonitrile rubber was digested in a mixture of the tetrahydrofurane and the ethyl acetate together with the vinyl tri-polymer. The chlorinated rubber and the benzoic acid modified polypropylene adipate was then added, and digestion continued. A Werner Pfleiderer type mixer, water cooled, was used for the digestion.

Immediately, before use this solution was mixed with a solution of the p-p'-p" tri-isocyanato triphenylmethane dissolved in the trichlorethylene. The mixed composition was then spread on to the fabric by doctor knife so as to give a coating weight of between 0.2 and 0.5 ounces per square yard dry weight. The coating was then force dried, drying conditions being not less than two minutes at 150° C.

The poly-acrylonitrile butadiene of the above base coating composition was that marketed under the registered trademark "Hycar" 1041, and was a copolymer of acrylonitrile and butadiene wherein the acrylonitrile content was 33%.

The vinyl tripolymer was that marketed under the registered mark "Vinylite" VAGH, and was of the approximate composition: vinyl chloride 91%, vinyl acetate 3%, vinyl alcohol 6%.

The chlorinated rubber was that marketed under the registered trademark "Alloprene" B, and had a chlorine content of approximately 65%.

The polymeric plasticiser was polypropylene adipate modified with benoxic acid.

EXAMPLE 2

The base coated fabric produced in Example 1 was then top coated with a plastisol coating of polyvinyl chloride according to conventional and well known procedures, the vinyl coating being subsequently fused and embossed.

The base fabric had an original double tongue tear strength of 120 pounds. After coating with the base coat and surface coating, the tear strength was 110 pounds, while the vinyl coating had a peeling adhesion greater than 40 pounds per inch wide strip; in addition the resulting product was soft and pliable and the coating was not broken by 1,000,000 flex cycles. Alternatively the polyvinyl chloride top coating could have been based on polyvinyl chloride copolymers and could have been applied as an organosol spreading mass or by other conventional calendering or laminating techniques. No particular limit is placed on the composition of the polyvinyl chloride top coat.

Departures from the composition of Example 1 can be made without departing from the spirit of the invention. It may contain from 12 to 22% of the acrylonitrile butadiene, from one to 3% of the vinyl tripolymer, from 3 to 7% of the chlorinated rubber, based on the total composition. The amount of the p-p'-p" tri-isocyanato triphenylmethane should represent not less than 7% of the total composition solids though increased quantities up to three times this amount have been used without deleterious effect. For the retention of the best balance between adhesion and tear strength the concentration of the the plasticiser, benzoic acid modified polypropylene adipate, should be between 2.0 and 3.0% of the total composition.

In place of the poly-acrylonitrile butadiene quoted, similar copolymers may be used wherein the acrylonitrile content may be as low as 28% or as high as 38%.

The chlorinated rubber may contain as little as 50% chlorine.

It is not essential to use plasticiser though by such means improved tear strength is obtained in the final product. Most polymeric plasticisers as used with synthetic rubbers are effective to some degree in retaining tear strength in the coated fabric though polymers of polypropylene glycol adipate modified with lauric or benzoic acid are preferred.

The solvents used for digestion may be any of the primary solvents for acrylonitrile rubbers, in conjunction with secondary solvents, providing such solvents do not contain groups such as $-NH_2$, $-COOH$ or $-OH$ which react with isocyanate groups. It will not be desirable to use solvents which are not volatile to permit drying of the base coated fabric in one pass through the spreading machine oven. The preferred solvents are tetrahydrofurane with ethyl acetate as the weaker solvent, but alternatively solvents such as nitromethane, nitroethane, 1-nitropropane, 2-nitropropane, ethylene di-chloride, chloroform or chlorobenzene may be used in conjunction with solvents as methyl ketone, methyl isobutyl ketone, butyl acetate or trichlorethylene.

Other tri-iso-cyanates are effective in curing the composition though the stated tri-phenylmethane derivative is preferred.

The products of this invention combine the high tensile strength, tear strength and wearing properties of the polyamide or polyester base fabric with the water imperviousness, wearing properties and decorative potential of the vinyl coating. It will be observed that only one base coat is required, and this is applied by the conventional spreading techniques as used for the application of polyvinyl chloride coatings.

I claim:

1. Process for the manufacture of coated polyester and polyamide fabrics comprising the steps of applying to the fabric a base layer, then drying the base layer, and then applying to the fabric coated with the dried base layer a surface coating layer consisting substantially of compositions selected from the group consisting of polyvinyl chloride and copolymers of vinyl chloride; characterized in that the constituents of the base layer are: between 12% and 22% by weight of acrylonitrile rubber; between 1% and 3% by weight of a vinyl tripolymer of which more than haf the weight is vinyl chloride and the remainder is vinyl acetate and vinyl alcohol; between 3% and 7% by weight of chlorinated rubber; between 2% and 3% by weight of plasticiser which is a polymeric glycol ester modified with a monocarboxylic acid; an organic tri-isocyanate in an amount at least 7% of the total weight of the said solids; and a solvent.

2. Process according to claim 1, wherein the plasticiser is polypropylene adipate modified with benzoic acid.

References Cited in the file of this patent

UNITED STATES PATENTS

| 2,606,162 | Coffey et al. | Aug. 5, 1952 |
| 2,766,164 | Salem | Oct. 9, 1956 |
| 2,930,106 | Wrotnowski | Mar. 29, 1960 |

FOREIGN PATENTS

| 604,834 | Britain | July 12, 1948 |